No. 713,475. Patented Nov. 11, 1902.
J. C. MIMS.
PROCESS OF REFINING ASPHALTIC MINERAL OILS.
(Application filed Feb. 13, 1902.)
(No Model.)
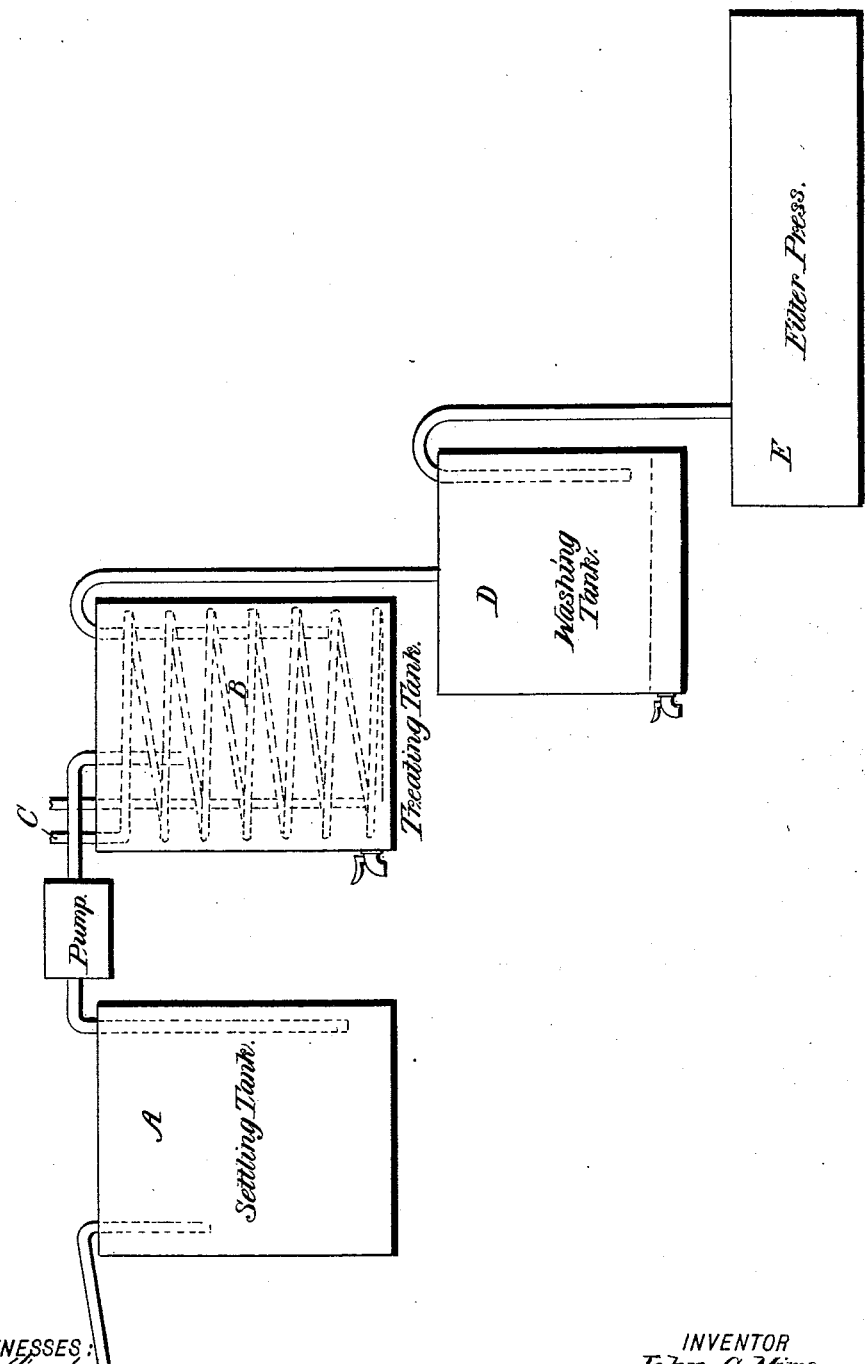
WITNESSES:
INVENTOR
John C. Mims,
BY
ATTORNEYS

UNITED STATES PATENT OFFICE.

JOHN CARWILE MIMS, OF NEW ORLEANS, LOUISIANA, ASSIGNOR OF ONE-HALF TO QUITMAN KOHNKE, OF NEW ORLEANS, LOUISIANA.

PROCESS OF REFINING ASPHALTIC MINERAL OILS.

SPECIFICATION forming part of Letters Patent No. 713,475, dated November 11, 1902.

Application filed February 13, 1902. Serial No. 93,869. (No specimens.)

*To all whom it may concern:*

Be it known that I, JOHN CARWILE MIMS, a citizen of the United States, and a resident of New Orleans, in the parish of Orleans and State of Louisiana, have made certain new and useful Improvements in Processes of Refining Asphaltic Mineral Oils, of which the following is a specification.

My process relates to refining asphaltic mineral oils without distillation—such, for instance, as the oils yielded by wells situated in the States of Texas and Louisiana, whose product contains a high percentage of asphaltum. My process is designed to remove this asphaltum and comprises the steps hereinafter detailed.

For a more ready understanding of my process I will describe it with reference to an apparatus illustrated in the accompanying drawing, in which A indicates a settling-tank, from which the oil, freed from sand, dirt, &c., is forced into the primary treating-tank B, provided with a steam-heating coil C. From said tank B the oil is conveyed into a tank D, where the acid is washed out, and thence to a filter-press E for completion of the purifying process. The oil to be treated is allowed to stand until all sand, dirt, and other similar foreign matter has settled. The oil is first pumped into the tank A, where this settling occurs. From such tank the oil floating above the sediment is pumped or otherwise conveyed into the tank B, where it is treated as follows: The oil is heated, preferably by a steam-coil C, to about 80° centigrade, and then potassium bichromate and sulfuric acid are added for the purpose, primarily, of precipitating and rendering insoluble the asphaltum and tarry matter held in solution or in suspension and incidentally to oxidize the sulfur. The quantity of these ingredients is necessarily varied with the nature of the oil treated, for the greater the per cent. of asphaltum the greater the proportion of the acid, and it is obvious that a strong acid will effect the desired result in a shorter time than a weaker one. Ordinarily the proportions may be as follows: Potassium bichromate, five parts, by weight; sulfuric acid, (ninety per cent.,) ninety-five parts, by weight. From one to ten per cent., by weight, of this mixture is to be added to the oil—that is to say, an amount of the mixture is added to the oil which shall be, by weight, from one to ten per cent. of the weight of the oil.

After the addition of the bichromate and acid, as above stated, the contents of the treating-tank B are stirred or agitated so as to thoroughly mix them, and then they are allowed to stand till the asphaltum and tar and similar or related substances which have been rendered insoluble shall have settled or precipitated to the bottom of the tank.

The temperature above mentioned is not necessary, since the same changes will occur at the ordinary temperature, although much more slowly. The oil is then drawn off from the treating-tank B, leaving the asphaltum, tar, and related products and the greater portion of the acid at the bottom of the tank. The oil is conveyed to a third tank D, wherein it is washed with water containing sodium carbonate and sodium hydroxid until free from acid and decidedly alkaline in character.

The alkaline solution used in my process is made by taking five parts, by weight, of sodium hydroxid; five parts, by weight, of sodium carbonate, and ninety parts, by weight, of water. After this treatment the liquid mixture is allowed to remain quiescent until the water has separated from the oil. Then the water is drawn off from the bottom of the washing-tank, and another quantity of water is introduced for further washing the oil and separating the alkali from it. This operation is repeated as often as may be necessary to entirely free the oil from alkali. The oil is now practically ready for use as a lubricant or for the manufacture of lubricants by mixing with other oils, fats, &c.; but for obtaining an oil having the greatest degree of purity or freedom from foreign substances the oil may be filtered, and for this purpose it is pumped or otherwise drawn off from the washing-tank D to a filter-press E of a well-known construction. By my process the gummy or adhesive substances which at present prevent the use of the so-called "Texas" oils and others of similar character are effectually removed, as is also the foul odor.

Having thus described my invention, what I claim as new, and desire to secure by Letters Patent, is—

The process of removing asphaltum from mineral oils containing a high percentage of asphaltum which consists in adding to the oil a mixture of about five parts by weight of potassium bichromate to ninety-five parts of sulfuric acid in quantity equal to one to ten per cent. of the oil, allowing the asphaltum and associated impurities to settle, and then washing the oil with an aqueous solution containing about five per cent. of sodium hydroxid and five per cent. of sodium carbonate and then separating the purified oil from the sedimentary matter as described.

JOHN CARWILE MIMS.

Witnesses:
J. G. RYAN,
ALBERT CHASTANT.